(12) United States Patent
Lin et al.

(10) Patent No.: US 8,125,462 B2
(45) Date of Patent: Feb. 28, 2012

(54) PROJECTING CAPACITIVE TOUCH SENSING DEVICE, DISPLAY PANEL, AND IMAGE DISPLAY SYSTEM

(75) Inventors: Wei-Cheng Lin, Chu-Nan (TW);
Kai-Chieh Yang, Chu-Nan (TW);
Fu-Yuan Hsueh, Chu-Nan (TW);
Ting-Kuo Chang, Chu-Nan (TW)

(73) Assignee: Chimei Innolux Corporation, Miao-Li County (TW)

( * ) Notice: Subject to any disclaimer, the term of this patent is extended or adjusted under 35 U.S.C. 154(b) by 784 days.

(21) Appl. No.: 12/207,264

(22) Filed: Sep. 9, 2008

(65) Prior Publication Data

US 2009/0073135 A1 Mar. 19, 2009

Related U.S. Application Data

(60) Provisional application No. 60/971,924, filed on Sep. 13, 2007.

(30) Foreign Application Priority Data

Mar. 20, 2008 (TW) ............................... 97109820 A

(51) Int. Cl.
*G06F 3/041* (2006.01)
(52) U.S. Cl. ...................... 345/173; 345/174; 178/18.06
(58) Field of Classification Search .................. None
See application file for complete search history.

(56) References Cited

U.S. PATENT DOCUMENTS

| 4,087,625 | A * | 5/1978 | Dym et al. ................. 178/18.06 |
| 7,218,124 | B1 * | 5/2007 | Mackey et al. .............. 324/660 |
| 7,394,458 | B2 * | 7/2008 | Lyon et al. .................... 345/173 |
| 7,808,255 | B2 * | 10/2010 | Hristov et al. ............... 324/686 |
| 2007/0257894 | A1 * | 11/2007 | Philipp ......................... 345/173 |
| 2007/0279395 | A1 * | 12/2007 | Philipp et al. ................. 345/173 |

OTHER PUBLICATIONS

Hristov et al., U.S. Appl. No. 60/910,441 of U.S. Patent No. 7,808,255, filed Apr. 5, 2007.*

* cited by examiner

*Primary Examiner* — Richard Hjerpe
*Assistant Examiner* — Christopher Thompson
(74) *Attorney, Agent, or Firm* — Morris Manning & Martin LLP; Tim Tingkang Xia, Esq.

(57) ABSTRACT

The present invention relates to a projecting capacitive touch sensing device, display panel, and image display system. The projecting capacitive touch sensing comprises an array of a plurality of sensing units, each sensing unit including: a first electrode made of a sensing material, at least one second electrode made of a sensing material and being disposed around the peripheral of the first electrode, at least one first sensing axis electrically connected to the first electrode, and at least one second sensing axis electrically connected to the second electrodes. The first electrode is quadrangle, while the second electrodes are triangular-shaped. The first electrode and the plurality of second electrodes are arranged to form a rectangular, and a non-sensing area is defined between the first electrode and the second electrodes.

17 Claims, 4 Drawing Sheets

PROJECTING CAPACITIVE TOUCH SENSING DEVICE, DISPLAY PANEL, AND IMAGE DISPLAY SYSTEM

BACKGROUND OF THE INVENTION

1. Field of the Invention

The present invention relates to a projecting capacitive touch sensing device, display panel, and image display system. More particularly, the present invention relates to a projecting capacitive touch sensing device, display panel, and image display system that can be integrated into an electronic device.

2. Description of the Related Art

Touch sensing technologies are upgrading constantly in recent years, and the improved quality and functionality of related products make the applications of touch sensing prodwucts even more commonplace. Touch sensing device are widely used in consumer electronics nowadays, such as mobile phones, digital cameras, PDAs, electronic dictionaries, notebook computers, desktop computers, televisions, GPS receivers, automotive displays, aircraft displays, digital photo frames, portable DVD players, etc.

In brief, the work of a conventional touch sensing can be described as follows: First, the user touches the touch sensing device with his or her finger or with a conductive device; at the moment the touch occurs, a capacitance effect is generated; the location of the touch can be determined from the change in capacitance detected by the capacitance sensor. The above method has been disclosed in U.S. Pat. No. 6,535,200 entitled "Capacitive Position Sensor" and in U.S. Pat. No. 6,297,811 entitled "Projective Capacitive Touchscreen." Nonetheless, when the number of sensor contained in a touch sensing device increases, the number of sensing axes configured within the device will increase accordingly, and the applied circuits within the device may become more complex. In that case, the size, manufacturing cost, or packaging cost for a touch sensor, or an electronics product applying such, will increase consequently.

Therefore, it is necessary to develop a touch sensomg device that overcomes the above drawbacks of a conventional one by reducing the number of sensing axes configured within. With such an improved touch sensor, lower manufacturing cost and simplified applied circuits can be achieved.

SUMMARY OF THE INVENTION

It is an object of the present invention to provide an array of rhombic-shaped first electrodes along with triangular-shaped second electrodes, wherein the first electrodes are electrically connected to first sensing axes and the second electrodes are electrically connected to second sensing axes. The present invention enables a touch sensing device to accurately determine the location of a touch, which is made by the user's finger or conductive device, with the fewest number of the first sensing axes and second sensing axes. In consequence, the present invention can reduce the manufacturing cost for the touch sensor and simplify the applied circuits within it.

To achieve the above objects, the present invention provides a projecting capacitive touch sensing device which comprises an array of a plurality of sensing units, each sensing unit including: a first electrode made of a sensing material, a set of second electrodes having a plurality of second electrodes made of a sensing material and being disposed around the peripheral of the first electrode, a first sensing axis electrically connected to the first electrode, and a second sensing axis electrically connected to the second electrodes. The first electrode is quadrangle-shaped, while the second electrode is triangular-shaped. The first electrode and the plurality of second electrodes are arranged to form a quadrangle, and a non-sensing area is defined between the first electrode and the second electrode.

The present invention further provides a display panel having a projecting capacitive touch sensing device which comprises an array of a plurality of sensing units, each sensing unit including: a first electrode made of a sensing material, a set of second electrodes having a plurality of second electrodes made of a sensing material and being disposed around the peripheral of the first electrode, a first sensing axis electrically connected to the first electrode, and a second sensing axis electrically connected to the second electrode. The first electrode is quadrangle-shaped, while the second electrode is triangular-shaped. The first electrode and the plurality of second electrodes are arranged to form a quadrangle, and a non-sensing area is defined between the first electrode and the second electrodes.

The present invention yet provides an image display system including a display panel having a projecting capacitive touch sensing device which comprises an array of a plurality of sensing units, each sensing unit including: a first electrode made of a sensing material, a set of second electrodes having a plurality of second electrodes made of a sensing material and being disposed around the peripheral of the first electrode, a first sensing axis electrically connected to the first electrode, and a second sensing axis electrically connected to the second electrode. The first electrode is quadrangle-shaped, while the second electrode is triangular-shaped. The first electrode and the plurality of second electrodes are arranged to form a quadrangle, and a non-sensing area is defined between the first electrode and the second electrode.

The above objects and features of the present invention will become better understood with following descriptions and accompanying drawings, which are provided only for further elaboration without limiting or restricting the scope of the present invention.

DETAILED DESCRIPTION OF THE PREFERRED EMBODIMENT

The present invention now will be described more fully hereinafter with reference to the accompanying drawings, in which preferred embodiments of the invention are shown. It is to be understood that all kinds of alterations and changes can be made by those skilled in the art without deviating from the spirit and the scope of the invention. This description is not to be taken in a limiting sense, but is made merely for the purpose of illustrating the general principles of the invention.

Figure 1:
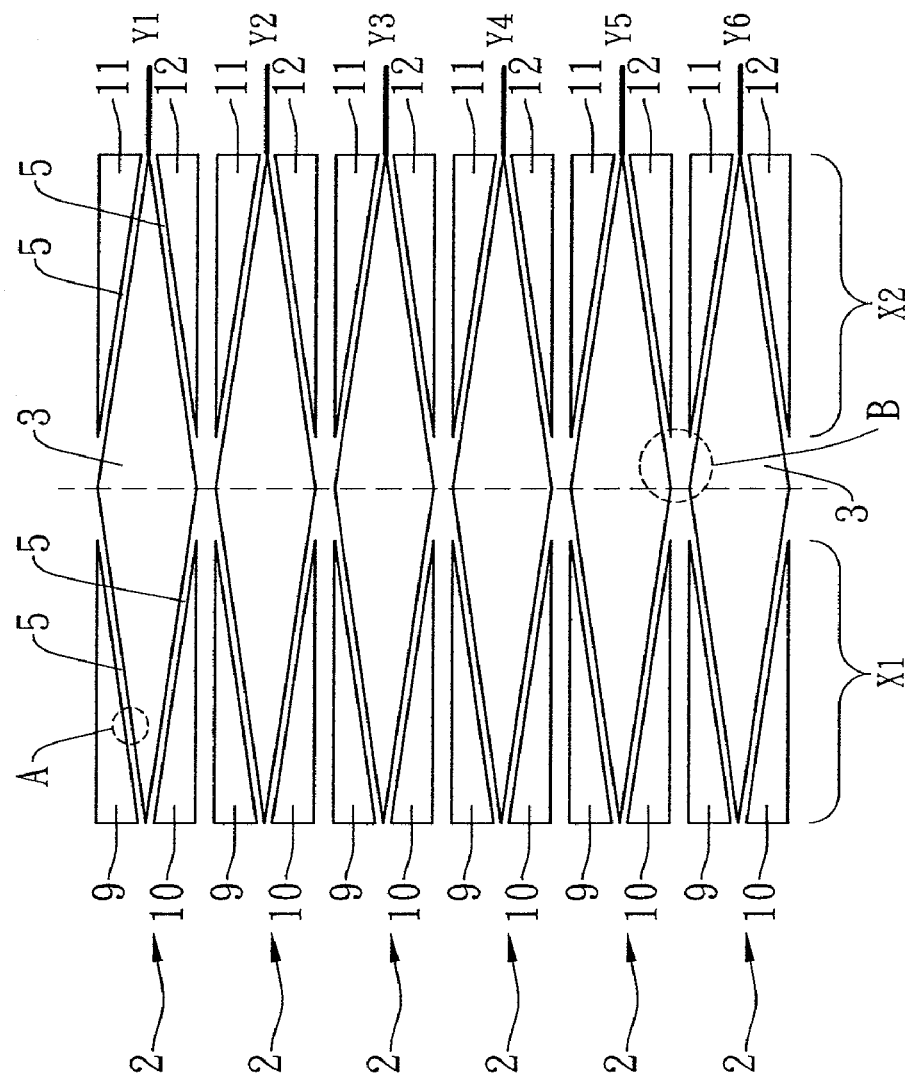
FIG. 1 shows a schematic view of a projecting capacitive touch sensing device according to a first embodiment of the present invention.

Referring to FIG. 1, a schematic view of a projecting capacitive touch sensing according to a first embodiment of the present invention is shown. In this embodiment, the projecting capacitive touch sensing device comprises six sensing units 2 arranged vertically, wherein the number of sensing units may be adjusted in accordance with the size of the display panel. Each sensing unit 2 comprises: a first electrode 3 made of a sensing material, which may be transparent and conductive indium tin oxide (ITO) or indium zinc oxide (IZO); a set of second electrodes including four second electrodes 9, 10, 11, and 12 disposed around the peripheral of the first electrode 3 to form a quadrate therewith, each second electrode being made of a sensing material such as transparent and conductive ITO or IZO; at least one first sensing axis (denoted as Y) electrically connected to the first electrode 3; and at least one second sensing axis (denoted as X) electrically connected to the second electrodes 9, 10, 11, and 12.

The six first sensing axes Y1, Y2, Y3, Y4, Y5, and Y6 are arranged vertically in numeral order, and are electrically connected to the six first electrodes 3. The two second sensing axes X1 and X2 are electrically connected to the second electrodes 9, 10, 11, and 12, wherein the second sensing axis X1 is electrically connected to the second electrodes 9 and 10 while the second sensing axis X2 is electrically connected to the second electrodes 11 and 12. The first electrode 3 is square-shaped, preferably rhombic-shaped, and the second electrodes are triangular-shaped, preferably right triangular-shaped. Each hypotenuse of the second electrodes 9, 10, 11, and 12 are arranged opposite to one side of the first electrode 3 such that the four second electrodes and the first electrode gather to form a quadrangle, preferably a rectangle. A non-sensing area 5 is defineed between the first electrode 3 and the set of second electrodes.

As shown in FIG. 1, the set of second electrodes includes a first triangular-shaped second electrode 9, a second triangular-shaped second electrode 10, a third triangular-shaped second electrode 11, and a fourth triangular-shaped second electrode 12. The first triangular-shaped second electrode 9 is disposed on the upper left side of the first electrode 3, the second triangular-shaped second electrode 10 is disposed on the lower left side of the first electrode 3, the third triangular-shaped second electrode 11 is disposed on the upper right side of the first electrode 3, and the fourth triangular-shaped second electrode 12 is disposed on the lower right side of the first electrode 3. The shape of the first triangular-shaped second electrode 9 becomes narrower from left to right, and so does that of the second triangular-shaped second electrode 10. On the other hand, the shape of the third triangular-shaped second electrode 11 becomes narrower from right to left, and so does that of the fourth triangular-shaped second electrode 12. The gradual change in the widths of the second electrodes 9, 10, 11, and 12 is favorable for determining the location of a touch when a finger or a conductive device touches the sensor and a change in capacitance is detected.

With further reference to FIG. 1, at the moment that the user, using a finger or a conductive device, touches the circle A of the projecting capacitive touch sensing device according to the present invention, a capacitance effect occurs. Accordingly, by measuring the difference in the amount of electric charge, the touch location can be determined. To be more specific, the first electrode 3 at circle A is electrically connected to the first sensing axis Y1, where the amount of charge is 1Q; the first triangular-shaped second electrode 9 is electrically connected to the second sensing axis X1, where the amount of charge is 1Q. With the information on the amounts of charge corresponding to the first sensing axis and to the second sensing axis respectively, the exact location of the touch can be determined.

Then, the user touches the circle B area, which covers two of the first electrodes 3 of the projecting capacitive touch sensing device, with each electrode 3 being electrically connected to the first sensing axis Y5, where the amount of charge is 5Q, and to the first sensing axis Y6, where the amount of charge is 6Q, respectively. By calculating (5Q+6Q)/2=5.5Q, the result is obtained and showed the touch falls on the area between the first sensing axis Y5 and the first sensing axis Y6. Also, the circle B area covers the second electrodes 11 and 12 that are electrically connected to the second sensing axis X2 (the amount of charge is 2Q). With the combined results of 5.5Q, corresponding to the first sensing axis, and 2Q, corresponding to the second sensing axis, the exact location of the touch can be determined.

Figure 2:
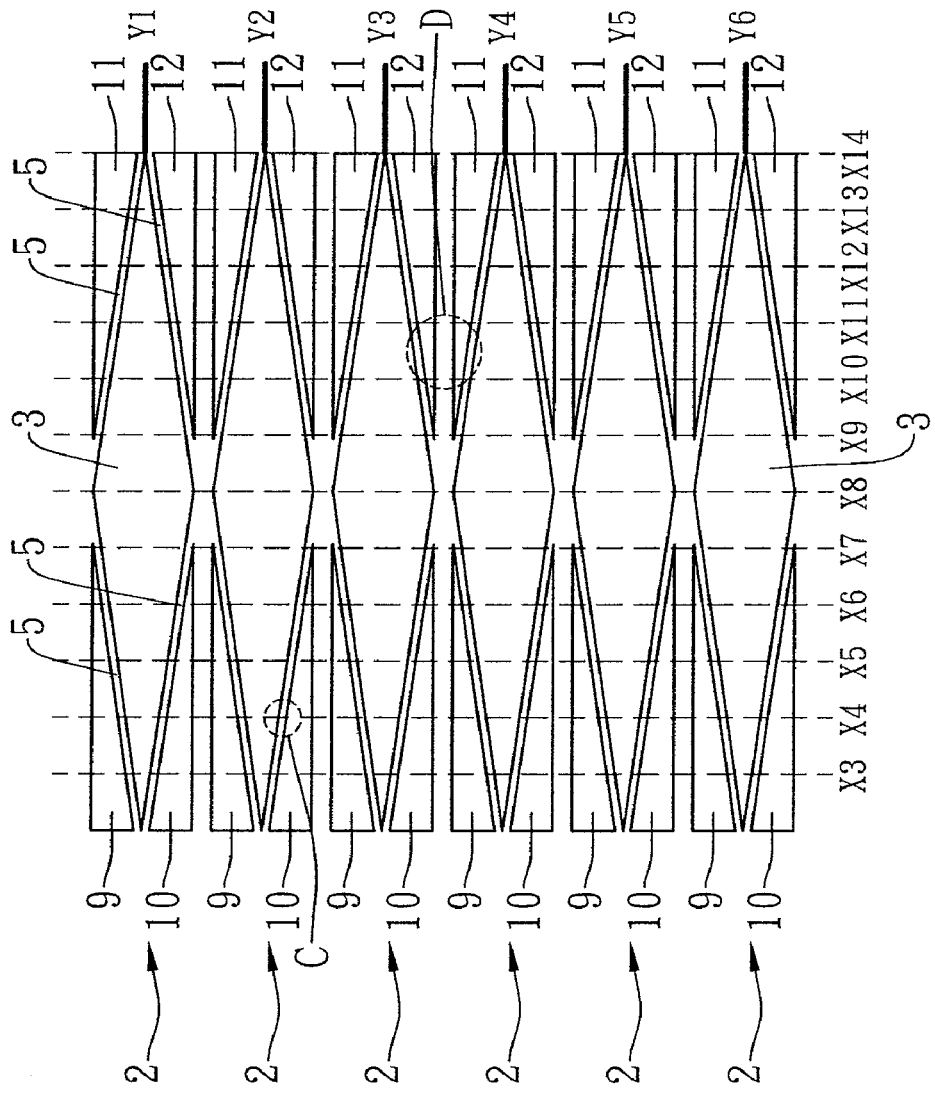
FIG. 2 shows a schematic view of a projecting capacitive touch sensing device according to a second embodiment of the present invention.

Referring to FIG. 2, a schematic view of a projecting capacitive touch sensing device according to a second embodiment of the present invention is shown. In this embodiment, the projecting capacitive touch sensing device comprises six sensing units 2 arranged vertically, wherein the number of sensing units may be adjusted in accordance with the size of the display panel. Each sensing unit 2 comprises: a first electrode 3 made of a sensing material, which may be transparent and conductive indium tin oxide (ITO) or indium zinc oxide (IZO); a set of second electrodes including four second electrodes 9, 10, 11, and 12 disposed around the peripheral of the first electrode 3, each second electrode being made of a sensing material such as transparent and conductive ITO or IZO; at least one first sensing axis (denoted as Y) electrically connected to the first electrode 3; and at least one second sensing axis (denoted as X) electrically connected to the second electrodes 9, 10, 11, and 12.

The six first sensing axes Y1, Y2, Y3, Y4, Y5, and Y6 are arranged vertically in numeral order, and are electrically connected to the six first electrodes 3. The six second sensing axes X3, X4, X5, X6, X7, and X8 are electrically connected to the second electrodes 9 and 10, and the six second sensing axes X9, X10, X11, X12, X13, and X14 are electrically connected to the second electrodes 11 and 12.

When the user touches the circle C of the projecting capacitive touch sensing device according to the present invention with a finger or a conductive device, a capacitance effect occurs. The first electrode 3 at circle C is electrically connected to the first sensing axis Y2, where the amount of charge is 2Q; the second triangular-shaped second electrode 10 at circle C is electrically connected to the second sensing axis X4, where the amount of charge is 4Q. With the combined results of 2Q, corresponding to the first sensing axis, and 4Q, corresponding to the second sensing axis, the exact location of the touch can be determined.

When the user touches the circle D area with a finger or a conductive device, a capacitance effect occurs. The circle D area covers two of the first electrodes 3, with each electrode 3 being electrically connected to the first sensing axis Y3, where the amount of charge is 3Q, and to the first sensing axis Y4, where the amount of charge is 4Q, respectively. By calculating (3Q+4Q)/2=3.5Q, the result is obtained and showed the touch falls on the area between the first sensing axis Y3 and the first sensing axis Y4. Also, the circle D area covers the second electrodes 12 and 11 that are electrically connected to the second sensing axes X10 (the amount of charge is 10Q) and X11 (the amount of charge is 11Q) respectively. By calculating (10Q+11Q)/2=10.5Q, the result is obtained and showed the touch falls on the area between the second sensing axis 10 and second sensing axis 11. With the combined results of 3.5Q, corresponding to the first sensing axis, and 10.5Q, corresponding to the second sensing axis, the exact location of the touch can be determined.

Figure 3:
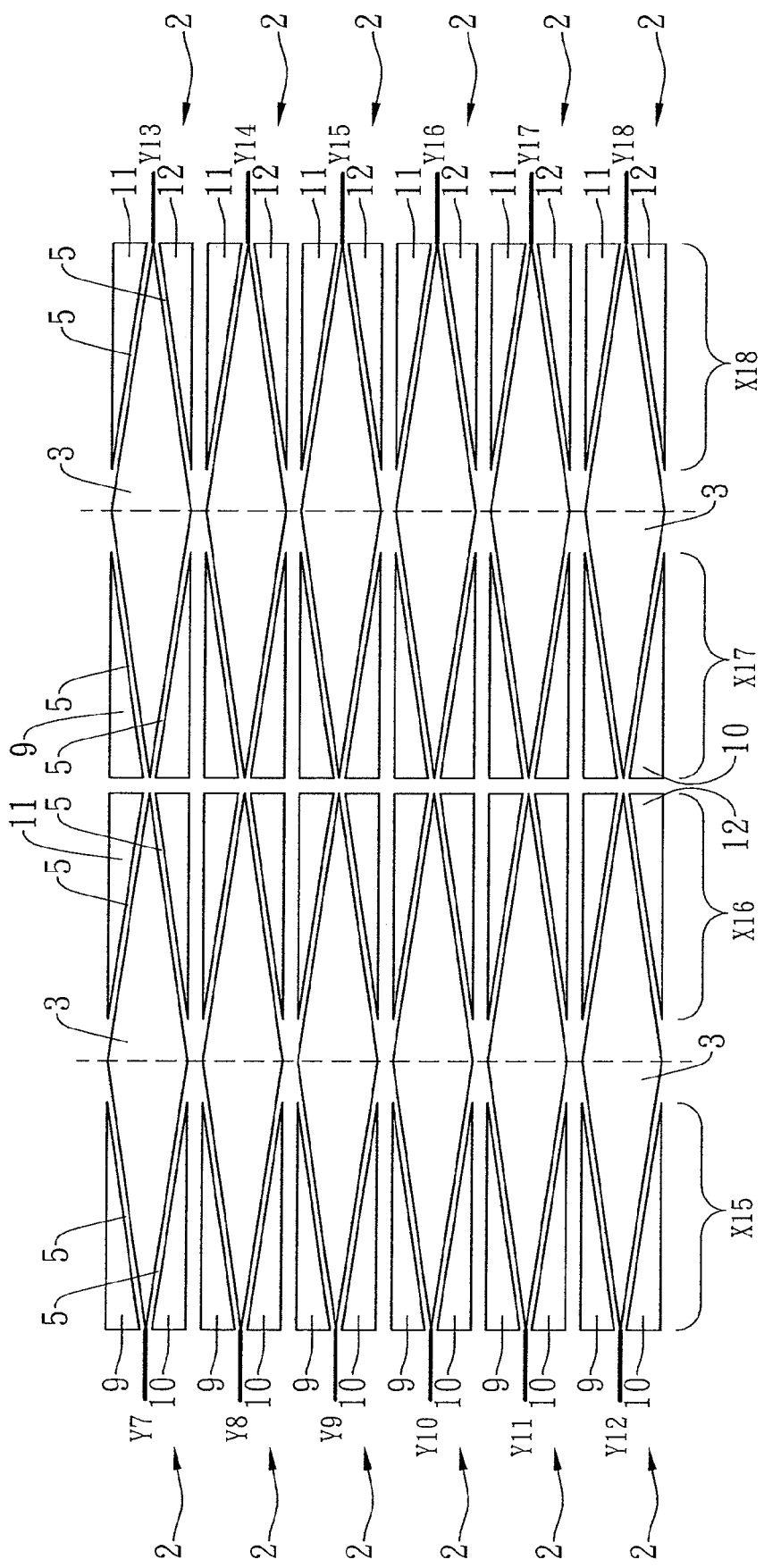
FIG. 3 shows a schematic view of a projecting capacitive touch sensing device according to a third embodiment of the present invention.

Referring to FIG. 3, a schematic view of a projecting capacitive touch sensing device according to a third embodiment of the present invention is shown. In this embodiment, the projecting capacitive touch sensing device comprises twelve sensing units 2 arranged vertically and horizontally, wherein the number of sensing units may be adjusted in accordance with the size of the display panel. Each sensing unit 2 comprises: a first electrode 3 made of a sensing material, which may be transparent and conductive indium tin oxide (ITO) or indium zinc oxide (IZO); a set of second electrodes including four second electrodes 9, 10, 11, and 12 disposed around the peripheral of the first electrode 3, each second electrode being made of a sensing material such as transparent and conductive ITO or IZO; at least one first sensing axis (denoted as Y) electrically is connected to the first electrode 3; and at least one second sensing axis (denoted as X) is electrically connected to the second electrodes 9, 10, 11, and 12.

The six first sensing axes Y7, Y8, Y9, Y10, Y11, and Y12 on the left are arranged vertically in numeral order, and are electrically connected to the six first electrodes 3; the six first sensing axes Y13, Y14, Y15, Y16, Y17, and Y18 on the right are arranged vertically in numeral order, and are electrically connected to the six first electrodes 3. Furthermore, there are four second sensing axes X15, X16, X17, and X18. The second sensing axis X15 is electrically connected to the second electrodes 9 and 10, the second sensing axis X16 to the second electrodes 11 and 12, the second sensing axis X17 to the second electrodes 9 and 10, and the second sensing axis X18 to the second electrodes 11 and 12.

Figure 4:
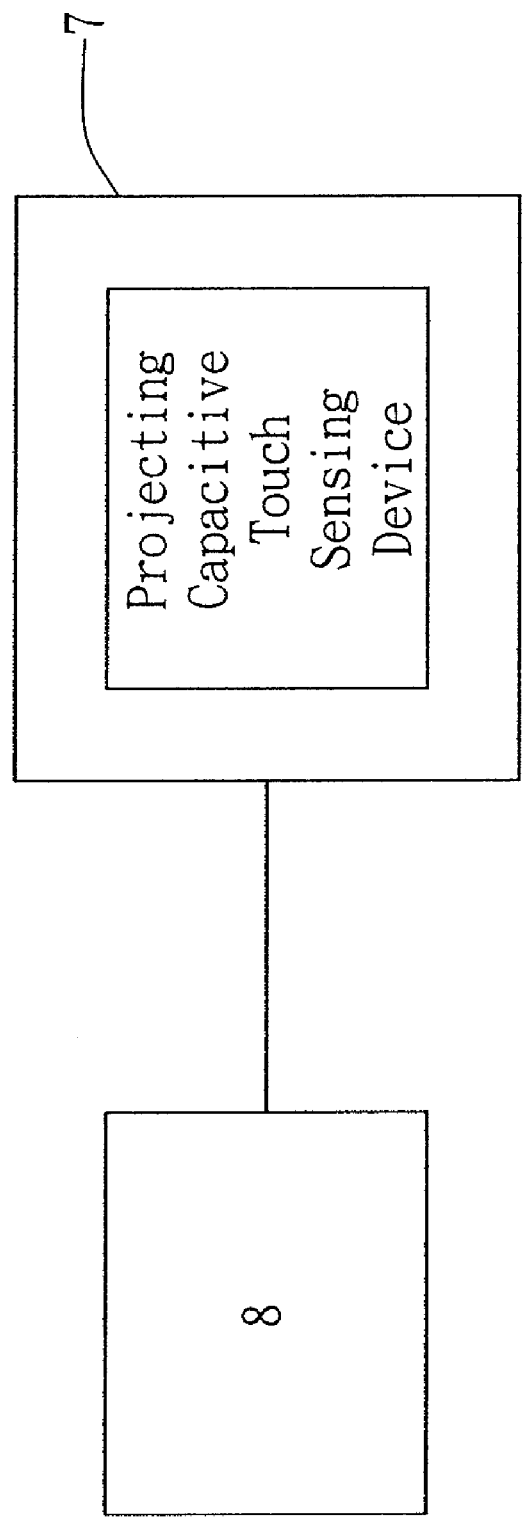
FIG. 4 shows the structural drawing of an image display system constructed according to an embodiment of the present invention.

Referring to FIG. 4, the structural drawing of an image display system constructed according to an embodiment of the present invention is shown. In this embodiment, an image display system 6 could include a display panel 7 comprising a projecting capacitive touch sensing device of this invention and a power supply 8, wherein the power supply 8 is coupled to the display panel 7 to provide it with electricity. The image display system 6 may be a mobile phone, digital camera, PDA, electronic dictionary, notebook computer, desktop computer, television, GPS receiver, automotive display, aircraft display, digital photo frame, portable DVD player, etc.

The advantageous features of the present invention are:
1. The arrangement of specially shaped first electrodes and second electrodes is favorable for determining the location of a touch accurately through the change in capacitance.
2. The specially shaped first electrodes and second electrodes of the present invention allow the touching sensor to determine the location of a touch with the fewest number of the first sensing axes and second sensing axes electrically connected to the first electrodes and second electrodes respectively. Therefore, the manufacturing cost for the touch sensor can be reduced.

While this invention has been described by way of examples and in terms of preferred embodiments, it is to be understood that this invention is not limited hereto, and that various changes, substitutions, and alterations can be made herein without departing from the spirit and scope of this invention as defined by the appended claims.

What is claimed is:

1. A projecting capacitive touch sensing device which comprises a plurality arrangements of sensing units, wherein each sensing unit comprises:
   a first electrode made of a sensing material, wherein the first electrode is square-shaped;
   a set of second electrodes having a plurality of second electrodes made of the sensing material and being disposed around the peripheral of the first electrode, wherein the second electrodes are triangular-shaped;
   a third electrode made of the sensing material, wherein the third electrode is square-shaped;
   a set of fourth electrodes having a plurality of fourth electrodes made of sensing material and being disposed around the peripheral of the third electrode, wherein the fourth electrodes are triangular-shaped;
   a first sensing axis electrically connected to the first electrode and the third electrode; and
   a second sensing axis electrically connected to the second electrodes and the fourth electrodes,
   wherein the first electrode and the second electrodes are arranged to form a quadrangle, and the third electrode and the fourth electrodes are arranged to form a quadrangle directly next to the quadrangle formed by the first and the second electrodes;
   a non-sensing area is defined between the first electrode and the second electrode.

2. The touch sensing device of claim 1, wherein the first electrode is rhombic-shaped and the second electrodes are right triangular-shaped, wherein each hypotenuse of the second electrodes are arranged opposite to one side of the first electrode such that the second electrodes are disposed along with the first electrode to form a rectangular-pattern.

3. The touch sensing device of claim 1, wherein the set of second electrodes includes a first triangular-shaped second electrode, a second triangular-shaped second electrode, a third triangular-shaped second electrode, and a fourth triangular-shaped second electrode, wherein the first triangular-shaped second electrode is disposed on the upper left side of the first electrode, the second triangular-shaped second electrode is disposed on the lower left side of the first electrode, the third triangular-shaped second electrode is disposed on the upper right side of the first electrode, and the fourth triangular-shaped second electrode is disposed on the lower right side of the first electrode.

4. The touch sensing device of claim 3, wherein the shape of the first triangular-shaped second electrode and the shape of the second triangular-shaped second electrode become narrower from left to right.

5. The touch sensing device of claim 3, wherein the shape of the third triangular-shaped second electrode and the shape of the fourth triangular-shaped second electrode become narrower from right to left.

6. The touch sensing device of claim 1, wherein the plurality of sensing units are arranged vertically.

7. The touch sensing device of claim 1, wherein the plurality of sensing units are arranged horizontally.

8. The touch sensing device of claim 1, wherein the first electrode and the second electrode are made of transparent and conductive ITO or IZO.

9. A display panel having a projecting capacitive touch sensing device which comprises a plurality of arrangements sensing units, wherein each sensing unit comprises:
   a first electrode made of a sensing material, wherein the first electrode is square-shaped;
   a set of second electrodes having a plurality of second electrodes made of the sensing material and being disposed around the peripheral of the first electrode, wherein the second electrodes are triangular-shaped;
   a third electrode made of the sensing material, wherein the third electrode is square-shaped;
   a set of fourth electrodes having a plurality of fourth electrodes made of sensing material and being disposed around the peripheral of the third electrode, wherein the fourth electrodes are triangular-shaped;

a first sensing axis electrically connected to the first electrode and the third electrode; and a second sensing axis electrically connected to the second electrode and the fourth electrodes, wherein the first electrode and the second electrodes are arranged to form a rectangular-pattern, and the third electrode and the fourth electrodes are arranged to form a quadrangle directly next to the quadrangle formed by the first and the second electrodes; a non-sensing area is defined between the first electrode and the second electrode.

10. The display panel of claim 9, wherein the first electrode is rhombic-shaped and the second electrodes are right triangular-shaped, wherein each hypotenuse of the second electrodes are arranged opposite to one side of the first electrode such that the four second electrodes are disposed along with the first electrode to form a rectangular-pattern.

11. The display panel of claim 9, wherein the set of second electrodes includes a first triangular-shaped second electrode, a second triangular-shaped second electrode, a third triangular-shaped second electrode, and a fourth triangular-shaped second electrode, wherein the first triangular-shaped second electrode is disposed on the upper left side of the first electrode, the second triangular-shaped second electrode is disposed on the lower left side of the first electrode, the third triangular-shaped second electrode is disposed on the upper right side of the first electrode, and the fourth triangular-shaped second electrode is disposed on the lower right side of the first electrode.

12. The display panel of claim 11, wherein the shape of the first triangular-shaped second electrode and the shape of the second triangular-shaped second electrode become narrower from left to right.

13. The display panel of claim 11, wherein the shape of the third triangular-shaped second electrode and the shape of the fourth triangular-shaped second electrode become narrower from right to left.

14. The display panel of claim 9, wherein the plurality of sensing units are arranged vertically.

15. The display panel of claim 9, wherein the plurality of sensing units are arranged horizontally.

16. An image display system, comprising the display panel of claim 9 and a power supply coupled to the display panel to provide it with electricity.

17. The image display system of claim 16, wherein the image display system is a mobile phone, digital camera, PDA, electronic dictionary, notebook computer, desktop computer, television, GPS receiver, automotive display, aircraft display, digital photo frame, or portable DVD player.

* * * * *